May 29, 1923.
J. E. BERGSTRÖM
MILLING MACHINE
Filed Jan. 24, 1921
1,456,756
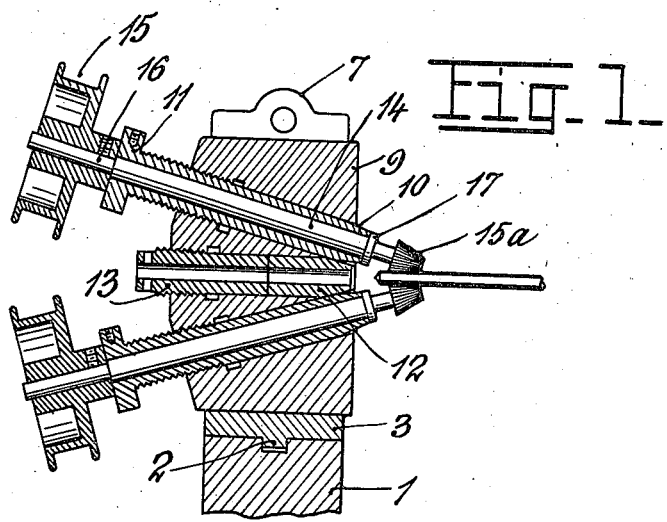
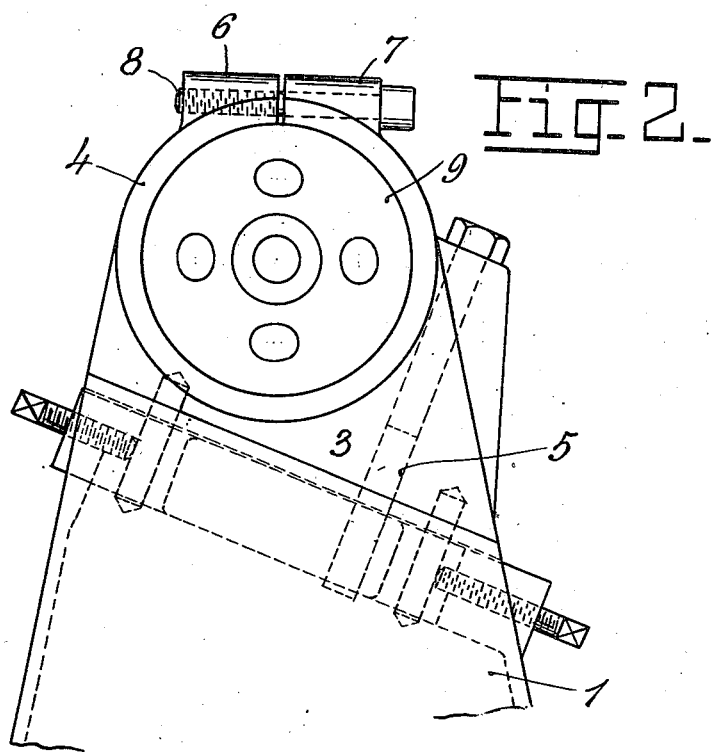
Inventor
Johan Erik Bergström
By B. Singer Atty.

Patented May 29, 1923.

1,456,756

UNITED STATES PATENT OFFICE.

JOHAN ERIK BERGSTRÖM, OF CHRISTIANIA, NORWAY, ASSIGNOR TO GUSTAF STAHLE, OF STOCKHOLM, SWEDEN.

MILLING MACHINE.

Application filed January 24, 1921. Serial No. 439,669.

(GRANTED UNDER THE PROVISIONS OF THE ACT OF MARCH 3, 1921, 41 STAT. L., 1313.)

*To all whom it may concern:*

Be it known that I, JOHAN ERIK BERGSTRÖM, a subject of the King of Norway, residing at 75 Waldemar Thranesgate, Christiania, Norway, have invented certain new and useful Improvements in Milling Machines (for which I have filed application for patent in Norway, dated January 8, 1920), of which the following is a specification.

The present invention has for its object a device especially adapted for milling one or more grooves in a cylindrical bar or the like.

The invention is illustrated in the annexed drawing in which:

Fig. 1 is a sectional view of the device.

Fig. 2 is an end view of the same, the driving pulleys being removed.

1 designates a suitable frame having a groove for taking up a tappet 2 connected to a slide 3 integral to a cylindrical frame 4. As the said groove in the frame 1 has an inclined direction a motion of the slide 3 will produce a vertical adjusting motion of the axis of the cylindrical frame. After adjusting the slide the latter may be fixed in its position by means of a bolt 5, passing through a slot in the slide or in any other way suitable for the purpose. The cylindrical frame is slit as shown in Fig. 2 and provided with lugs 6 and 7 which may be tightened as required by means of a bolt 8 which is threaded into the lug 6 and has its head bearing against lug 7.

The frame 4 encloses a turnable cutter block 9 which is cylindrical and may be angularly adjusted and also moved in an axial direction.

In the cutter block are a number of bores the axes of which converge towards a point in the axis of the cutter block. In these bores are placed sleeves 10, provided with threads at their head ends. The heads 11 are adapted to be manipulated by a wrench in order that the sleeves may be moved in one direction or another in the cutter block. Obviously it is sufficient for adjusting the sleeves that the part of the sleeve next to the head be provided with threads and the corresponding part of the bores in the cutter block 9 be also screw threaded.

In the block 9 is an axial opening taking up a clamping piece 12 having recesses coincident with the bores which receive the bearing sleeves 10 so that the clamping piece will tighten these sleeves when driven outwards. In order to adjust the clamping piece I provide a sleeve 13 which is threaded axially into the cutter block 9 and is suitably provided with holes for taking up an adjusting tool external to the cutter block.

In the sleeves 10 are placed spindles 14, at one end of which is attached a driving pulley 15 fixed to the same by means of a set screw 16. The pulley bears with a shoulder against the head 11. At the lower end the spindles are provided with a shoulder 17 bearing against the lower end of the sleeve 10. In this way casual axial movement of the spindles 14 is prevented after adjustment. To the end of the spindles 14 are fixed for instance by means of threads, suitably shaped milling cutters 15ª.

The sleeve 13 and clamping piece 12 have an axial opening adapted to receive the work piece.

It will be seen that the tools may be adjusted in any desired position to the work piece. By longitudinal adjustment of the frame 3 the tools may be lifted or lowered. By longitudinal adjustment of the sleeves 10 the position of the tools may be changed according to the dimensions of the work piece and by turning the block 9 the correct position of the tools to grooves in the work piece may be secured.

The movement of the cutter block may be obtained in any convenient manner.

Having now described my invention what I claim is:

1. In a milling machine, an inclined support, a cylindrical frame adjusted upon said inclined support, a turn-table cutter block resting in the said frame and angularly adjustable to any desired position, bearing sleeves each arranged in the cutter block at an acute angle to the axis thereof and in the plane of the said axis, and cutter spindles mounted in said sleeves.

2. In a milling machine, an inclined support, a cylindrical frame adjusted upon said inclined support, a turn-table cutter block resting in the said frame and angularly adjustable to any desired position, bearing sleeves arranged in the cutter block at an acute angle to the axis thereof and in the plane of the said axis, means for adjusting the sleeves axially in the cutter block and spindles resting in the said sleeves and provided with milling cutters at one end and driving sleeves at the opposite end.

3. In a milling machine, an inclined support, a cylindrical frame adjusted upon said inclined support, a turn-table cutter block resting in the said frame and angularly adjustable to any desired position, bearing sleeves each arranged in the cutter block at an acute angle to the axis thereof and in the plane of the said axis, cutter spindles mounted in said sleeves, means for adjusting the sleeves axially in the cutter block, a clamping piece having a surface bearing against the spindle sleeves, and a sleeve threaded into an axial bore of the cutter block and holding the clamping piece in place.

In testimony whereof I affix my signature in presence of two witnesses.

JOHAN ERIK BERGSTRÖM.

Witnesses:
S. SWENSON,
ELIN WAHMAN.